(12) United States Patent
Hess

(10) Patent No.: US 10,697,844 B2
(45) Date of Patent: Jun. 30, 2020

(54) COMPACT PRESSURE TRANSDUCER

(71) Applicant: Huba Control AG, Würenlos (CH)

(72) Inventor: Juerg Hess, Haegglingen (CH)

(73) Assignee: HUBA CONTROL AG, Wuerenlos (CH)

( * ) Notice: Subject to any disclaimer, the term of this patent is extended or adjusted under 35 U.S.C. 154(b) by 220 days.

(21) Appl. No.: 15/955,906

(22) Filed: Apr. 18, 2018

(65) Prior Publication Data

US 2018/0306663 A1 Oct. 25, 2018

(30) Foreign Application Priority Data

Apr. 19, 2017 (EP) .................................... 17166967

(51) Int. Cl.
*G01L 1/04* (2006.01)
*G01L 1/22* (2006.01)
(Continued)

(52) U.S. Cl.
CPC ............ *G01L 13/06* (2013.01); *G01L 9/0002* (2013.01); *G01L 9/0005* (2013.01);
(Continued)

(58) Field of Classification Search
CPC ......... G01L 1/00; G01L 1/04; G01L 1/16–22; G01L 9/00; G01L 9/0002; G01L 9/0005; G01L 9/0044; G01L 9/0047; G01L 9/0055; G01L 13/025; G01L 13/06; G01L 19/00; G01L 19/0069; G01L 19/14; G01L 19/148

See application file for complete search history.

(56) References Cited

U.S. PATENT DOCUMENTS 4,141,253 A * 2/1979 Whitehead, Jr. ....... G01L 9/0052
338/4
4,376,929 A 3/1983 Myhre ............................ 338/4
(Continued)

FOREIGN PATENT DOCUMENTS

EP 1953516 A1 8/2008 ............. B01D 65/10
GB 1307047 A * 2/1973 ............. G01L 9/045
(Continued)

OTHER PUBLICATIONS

Extended European Search Report, Application No. 18163881.8, 8 pages, dated Sep. 13, 2018.

*Primary Examiner* — Nguyen Q. Ha
(74) *Attorney, Agent, or Firm* — Slayden Grubert Beard PLLC

(57) ABSTRACT

The present disclosure includes a pressure transducer comprising: a frame; a cantilevered beam; a resilient beam portion; a signal processing circuit; a wiring terminal; and a support member. The resilient beam portion anchors the cantilevered beam to the frame. The cantilevered beam moves in response to a pressure-induced force applied to the cantilevered beam and the resilient beam portion bends producing a strain within the resilient beam portion. The support member comprises a cavity and the signal processing circuit is entirely installed inside the cavity. There is a strain gauge diffused into, implanted into, and/or affixed to the resilient beam portion. The cavity of the support member includes a first aperture disposed along the first surface of the support member and the inner surface of the frame covers the first aperture.

11 Claims, 2 Drawing Sheets

(51) Int. Cl.
*G01L 7/08* (2006.01)
*G01L 19/14* (2006.01)
*G01L 13/06* (2006.01)
*G01L 19/02* (2006.01)
*G01L 9/00* (2006.01)
*G01L 19/00* (2006.01)
*G01L 13/02* (2006.01)

(52) U.S. Cl.
CPC ......... *G01L 9/0044* (2013.01); *G01L 9/0047* (2013.01); *G01L 9/0055* (2013.01); *G01L 13/025* (2013.01); *G01L 19/0069* (2013.01); *G01L 19/02* (2013.01); *G01L 19/148* (2013.01)

(56) References Cited

U.S. PATENT DOCUMENTS

| | | | | |
|---|---|---|---|---|
| 4,395,915 A | * | 8/1983 | Singh | G01L 9/0052 338/4 |
| 4,791,818 A | | 12/1988 | Wilde | 73/861.24 |
| 5,177,661 A | | 1/1993 | Zavracky et al. | 361/283.4 |
| 5,511,427 A | * | 4/1996 | Burns | G01D 3/0365 374/118 |
| 5,844,141 A | | 12/1998 | Stansfeld | 73/702 |
| 6,973,837 B2 | * | 12/2005 | Barnett | G01D 3/022 73/765 |
| 7,290,453 B2 | | 11/2007 | Brosh | 73/720 |
| 9,645,032 B2 | * | 5/2017 | Shimoyama | G01L 9/0001 |
| 9,835,513 B2 | * | 12/2017 | Muller | G01L 19/141 |
| 9,863,828 B2 | * | 1/2018 | Innai | G01C 5/06 |
| 9,995,642 B2 | | 6/2018 | Shimoyama et al. | |
| 10,254,184 B2 | * | 4/2019 | Takayama | G01L 9/0051 |
| 10,451,510 B2 | * | 10/2019 | Shinohara | G01C 5/06 |
| 2005/0103114 A1 | | 5/2005 | Bly et al. | 73/754 |
| 2011/0005323 A1 | | 1/2011 | Enomoto et al. | 73/718 |
| 2014/0319628 A1 | | 10/2014 | Nakane et al. | 257/415 |
| 2016/0349130 A1 | | 12/2016 | Shimoyama et al. | 73/727 |
| 2017/0363497 A1 | * | 12/2017 | Clausen | G01L 9/0051 |

FOREIGN PATENT DOCUMENTS

| | | | | |
|---|---|---|---|---|
| GB | 2043907 A | * | 10/1980 | ............... G01L 9/04 |
| JP | 61088120 A | * | 5/1986 | ........... G01L 9/0052 |
| JP | 01242933 A | * | 9/1989 | ............... G01L 9/04 |
| JP | 05133828 A | * | 5/1993 | ........... G01L 9/0052 |
| JP | 2004045140 A | * | 2/2004 | ............... G01L 9/00 |
| JP | 2015028425 A | | 2/2015 | ............... B41J 2/045 |
| WO | 2016/056419 A1 | | 4/1916 | ............... G01L 9/00 |
| WO | 95/03532 A1 | | 2/1995 | ............. G01D 3/036 |
| WO | 02/101347 A1 | | 12/2002 | ............... G01L 9/00 |

* cited by examiner

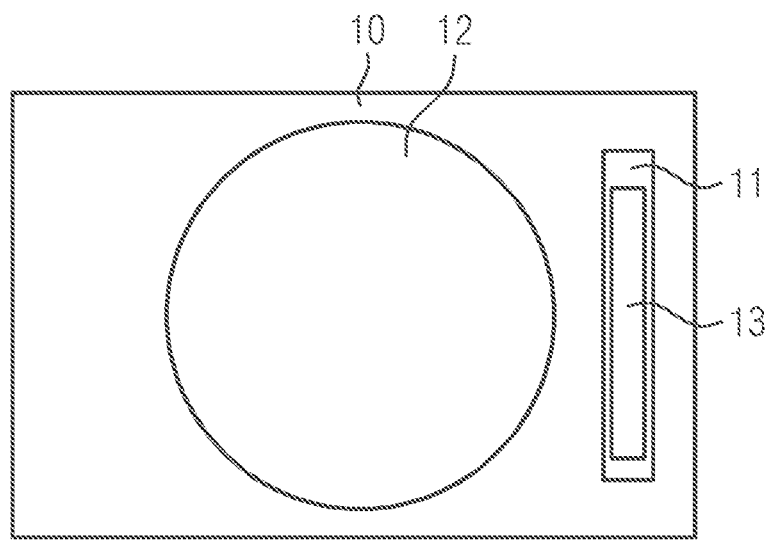

COMPACT PRESSURE TRANSDUCER

CROSS-REFERENCE TO RELATED APPLICATIONS

This application claims priority to EP Application No. 17166967.4 filed Apr. 19, 2017, the contents of which are hereby incorporated by reference in their entirety.

TECHNICAL FIELD

The present disclosure relates to pressure transducers. More particularly, the present disclosure focuses on a compact pressure transducer with signal processing circuitry.

BACKGROUND

Strain gauge beams are commonly employed to measure differential pressure. The U.S. Pat. No. 4,791,818 issued on 20 Dec. 1988 discloses a differential pressure transducer with a cantilever beam 30. The sensor of U.S. Pat. No. 4,791,818 comprises a strain gauge beam 46 arranged inside a sensor body 36. An electric sensor 49 such as a piezoelectric ceramic element is affixed to the surface of the strain gauge beam 46. The arrangement employs wires 53, 54 to transmit the electric signal out of sensor body 36. A measurement of differential pressure in accordance with U.S. Pat. No. 4,791,818 is potentially influenced by the orientation of the cantilever beam sensor 30. Also, the disclosure of U.S. Pat. No. 4,791,818 lacks a sophisticated approach that allows for conversion of particularly small mechanical strains into electric signals.

The U.S. Pat. No. 5,844,141 issued on 1 Dec. 1998. U.S. Pat. No. 5,844,141 teaches a sensor 10 with two silicon layers 11a, 11b enclosing a central layer 12. The central layer 12 has two beams 16. The beams 16 of U.S. Pat. No. 5,844,141 form a resonantly vibratable stress-sensitive member. The twin vibratable beams 16 connect via electrically conductive channels 23 to an electric driving signal. The arrangement determines changes in pressure from changes in the resonant frequency of the vibratable beams 16. The resonant frequency of the beams 16 of U.S. Pat. No. 5,844,141 is influenced by ambient factors such as temperature. The sensor of U.S. Pat. No. 5,844,141 thus employs a vibratable fork 20 to compensate for changes in temperature.

The U.S. Pat. No. 7,290,453B2 issued on 6 Nov. 2007. U.S. Pat. No. 7,290,453B2 discloses a pressure sensor assembly with piezo-resistive strain gauges 13 disposed on a force sensing beam. The piezo-resistive strain gauges 13, 14 of U.S. Pat. No. 7,290,453B2 are electrically arranged in a Wheatstone bridge. The Wheatstone bridge magnifies the conversion of forces into electric signals. U.S. Pat. No. 7,290,453B2 thereby tackles the challenge of efficient sensors for low pressures. The U.S. Pat. No. 7,290,453B2 acknowledges that thin diaphragms exhibit shortcomings. The specification teaches an integral diaphragm-beam and diaphragm-diaphragm approach to obviate problems related to thin diaphragms.

The U.S. Pat. No. 4,376,929 issued on 15 Mar. 1983. U.S. Pat. No. 4,376,929 teaches optimized stress and strain distribution diaphragms for pressure transducers. To that end, U.S. Pat. No. 4,376,929 discloses a plurality of recess portions 64 arranged along a cantilevered beam 61.

The patent application US2014/319628A1 was filed on 8 Apr. 2014 and was published on 30 Oct. 2014. US2014/319628A1 discloses a device with a glass substrate and with a function membrane formed on a surface of the glass substrate.

The patent application WO95/03532A1 was filed on 19 Jul. 1994 and was published on 2 Feb. 1995. WO95/03532A1 teaches a cantilevered microbeam temperature sensor.

The patent application EP1953516A1 was filed on 31 Jan. 2007 and was published on 6 Aug. 2008. EP1953516A1 deals with a micromechanical pressure sensing device.

The patent application US2011/005323A1 was filed on 8 Apr. 2009 and was published on 13 Jan. 2011. US2011/005323A1 pertains to a pressure-sensor with a mesh-like beam section.

The U.S. Pat. No. 5,177,661A was filed on 6 Mar. 1992 and issued on 5 Jan. 1993. U.S. Pat. No. 5,177,661A teaches a diaphragm pressure sensor utilizing silicon-on-insulator technology.

The patent application US2005/103114A1 was filed on 23 May 2003 and was published on 19 May 2005. US2005/103114A1 discloses a miniature sensor with a diaphragm formed by epitaxial growth of silicon.

The patent application US2016/349130A1 was filed on 27 Feb. 2015 and was published on 1 Dec. 2016. US2016/349130A1 teaches a pressure sensor.

SUMMARY

The instant disclosure teachings pressure transducers with signal processing functionality. Some embodiments include a miniaturized sensor with a signal processing unit that is shielded from ambient stresses. For example, a pressure transducer (1) for measuring pressure may include: a frame (2), at least a cantilevered beam (3), at least a resilient beam portion (4), a signal processing circuit (13), at least a wiring terminal, and a support member (10). A gap (5) is interposed between the at least a cantilevered beam (3) and the frame (2) and wherein the at least a resilient beam portion (4) anchors the at least a cantilevered beam (3) to the frame (2). The frame (2), the at least a cantilevered beam (3), and the at least a resilient beam portion (4) each provide a first surface and the frame (2) provides an inner surface opposite to its first surface. The at least a cantilevered beam (3) is configured to move from a first position relative to the frame (2) to a second position relative to the frame (2) in response to a pressure-induced force applied to the at least a cantilevered beam (3). The at least a resilient beam portion (4) is configured to bend due to said movement of the at least a cantilevered beam (3) thereby producing a strain within the at least a resilient beam portion (4). The support member (10) provides an inner surface (14a) abutting the inner surface of the frame (2) such that the inner surface (14a) of the support member (10) is interposed between the support member (10) and the frame (2). The support member (10) comprises at least a cavity (11). The signal processing circuit (13) is entirely installed inside the at least a cavity (11) of the support member (10). The at least a wiring terminal is mounted to the frame (2) and wherein the signal processing circuit (13) electrically connects to the at least a wiring terminal. The pressure transducer (1) comprises at least a strain gauge (7a-7d) and wherein the at least a strain gauge (7a-7d) is diffused into and/or implanted into, and/or affixed to the at least a resilient beam portion (4). The at least a cavity (11) of the support member (10) provides a first aperture disposed along the first surface (14a) of the support member (10) and the inner surface of the frame (2) covers the first aperture.

In some embodiments, the at least a cavity (11) provides at least an inner side-wall arranged adjacent the first aperture.

In some embodiments, the support member (10) provides a base surface (14b) opposite to its inner surface (14a) and wherein the at least a cavity (11) of the support member (10) provides a second aperture disposed along the base surface (14b) of the support member (10).

In some embodiments, the thickness of the support member (10) between its inner surface (14a) and its base surface (14b) is at least 800 micrometers.

In some embodiments, the first surface (14a) of the support member (10) is bonded to the second surface of the frame (2).

In some embodiments, the frame (2) is made of an electrically insulating material.

In some embodiments, the support member (10) is made of an electrically insulating material.

In some embodiments, the thickness of the frame (2) between its first surface and its inner surface is less than 250 micrometers.

In some embodiments, the pressure transducer (1) further comprises at least a strain gauge (7a-7d) and wherein the at least a strain gauge (7a-7d) is diffused into and/or implanted into, and/or affixed to the at least a resilient beam portion (4) such that the at least a strain gauge (7a-7d) is configured to produce an output signal as a function of the strain within the at least a resilient beam portion (4).

In some embodiments, the pressure transducer (1) further comprises at least two bonding wires and wherein each of the at least two bonding wires electrically connects to the at least a strain gauge (7a-7d).

In some embodiments, at least one of the bonding wires electrically connects to the at least a wiring terminal mounted to the frame (2).

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 3 is a plan view of an example support member according to the instant disclosure.

DETAILED DESCRIPTION

The instant disclosure details a pressure transducer with signal processing circuitry. The signal processing circuitry is arranged so as to inhibit any adverse effects of chemical and/or mechanical attack. To that end, the pressure transducer provides a substrate with a cavity. An aperture of the cavity allows for introduction of the signal processing circuit during assembly. The signal processing circuit is then installed inside the cavity. A frame portion covers the aperture of the cavity. The signal processing circuit is thus shielded from ambient influences by a portion of the frame and by the inner walls of the cavity. The assembly is particularly robust.

The arrangement of a signal processing unit inside a cavity of a support member also yields miniaturized pressure transducers. These compact sensors can be installed in a multitude of apparatuses and/or can be adapted to a multitude of environments. The problems identified in the known system may be resolved by a pressure transducer in accordance with the teachings of this disclosure.

In some embodiments, a pressure transducer has optimized resistance to ambient stresses such as chemical and/or mechanical attack. In some embodiments, a pressure transducer includes signal processing circuitry exhibiting optimum resistance to ambient stresses such as chemical and/or mechanical attack, with minimum hysteresis, that is accurate (substantially) regardless of its orientation, and (substantially) independent of temperature.

In some embodiments, teachings of the instant disclosure may enable miniaturized pressure transducers that are low-cost and suitable for large-scale production.

Some embodiments include a circuit for heating, cooling, air-conditioning and/or ventilation that comprises a pressure transducer in accordance with the instant disclosure, wherein the circuit may be a variable air volume system.

Figure 1:
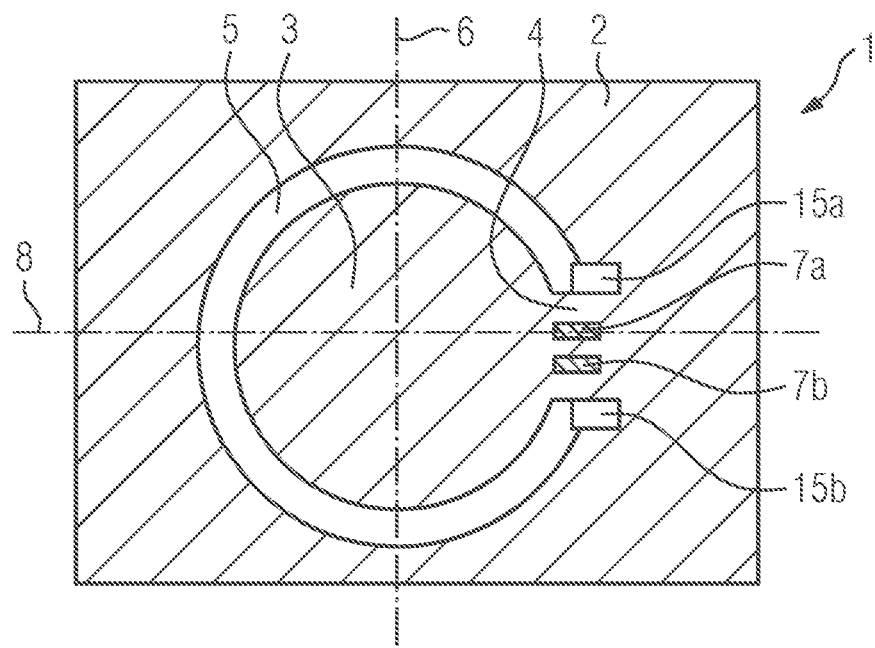
FIG. 1 is a plan view of an example pressure transducer according to the instant disclosure.

FIG. 1 shows a pressure transducer 1 which forms a sensor element.

The pressure transducer 1 comprises a frame 2 and a cantilevered beam in the form of a paddle 3. The paddle 3 is anchored to the frame 2 via a beam portion 4.

Paddle 3 and resilient beam portion 4 may be integrated into frame 2. They may comprise the same material such as a glass material and/or a ceramics material. The paddle 3, the beam portion 4, and the frame 2 can, by way of non-limiting example, be made of aluminum oxide ceramics ($Al_2O_3$). In some embodiments, the paddle 3, the beam portion 4, and the frame 2 are all made of aluminum oxide ceramics with more than 92% purity. In some embodiments, they comprise aluminum oxide with 96% purity. In some embodiments, they comprise aluminum oxide with purity above 99%. Higher levels of purity offer benefits in terms of mechanical tightness, mechanical brittleness, and dielectric strength.

For compatibility with electronic circuits, paddle 3, resilient beam portion 4, and frame 2 may comprise an electrical insulating material. In some embodiments, paddle 3, resilient beam portion 4, and frame 2 exhibit volume resistivities at 293K, at 9 Volts and under the application of direct current, of at least $10^{13}$ Ohm·m. In some embodiments, paddle 3, resilient beam portion 4, and frame 2 exhibit volume resistivities at 293K, at 9 Volts and under the application of direct current, of at least $10^{14}$ Ohm·m. In some embodiments, paddle 3, resilient beam portion 4, and frame 2 exhibit volume resistivities at 293K, at 9 Volts and under the application of direct current, of at least $10^{16}$ Ohm·m.

An arcuate gap 5 separates the paddle 3 from the frame 2. The circular portion of the gas-filled gap 5 largely encircles the paddle 3. The two ends of the gas-filled gap 5 point toward the beam portion 4. In some embodiments, arcuate gap 5 is filled with air. In some embodiments, gap 5 can, by way of example, also be filled with nitrogen and/or with helium and/or with an inert gas.

The paddle 3 as shown on FIG. 1 may be substantially cylindrical. In some embodiments, the cross-section of paddle 3 is quadratic, rectangular, or triangular. The paddle 3 may take on any suitable shape. The shape of the gas-filled gap 5 varies accordingly.

In some embodiments, the paddle 3 is less than 500 micrometers thick. In some embodiments, paddle 3 is less than 250 micrometers thick. In some embodiments, paddle 3 is less than 150 micrometers or even less than 100 micrometers thick. In some embodiments, paddle 3 is 120 micrometers thick. The thickness of paddle 3 may be uniform or substantially uniform. Pressure transducers with thin paddles 3 offer benefits in terms of sensitivity, since thin paddles 3 deflect further as a function of differential pressure. Also, thin paddles 3 help overcome shortcomings due to g-forces.

In some embodiments, the thickness of the beam portion 4 is the same as the thickness of the paddle 3.

In some embodiments, the lateral width of the arcuate gap 5 is at least equal to the thickness of the paddle 3. In some embodiments, the width of gap 5 is twice the thickness of paddle 3. In some embodiments, the width of gap 5 is at least five times the thickness of paddle 3. In some embodiments, the width of gap 5 is more than ten times the thickness of paddle 3.

In some embodiments, the gap 5 is at least 0.7 mm in width, at least 1.2 mm in width, at least 1.9 mm in width, or at least 2.5 mm in width. Wide gaps 5 reduce the likelihood of mechanical contact between the paddle 3 and the frame 2. Wide gaps 5 thus yield a lower risk of wedging between a paddle 3 and a frame 2.

In some embodiments, the length of the paddle 3 along a cross-section taken along the line 6 may be less than 25 millimeters. In some embodiments, the length of the paddle 3 is less than 20 millimeters. In some embodiments, the length of the paddle is less than 15 millimeters or even less than 10 millimeters.

Small paddles 3 allow for miniaturization of the (differential) pressure transducer. A paddle 3 less than 150 micrometers thick and with lateral dimensions of less than 15 millimeters allows for a transducer with sensitivity to differential pressures below 3 millibars. Small paddles 3 and small diaphragm-beam structures also allow for compact pressure transducers. A paddle 3 with lateral dimensions of less than 15 millimeters can be built into a frame 2 with lateral dimensions of 20 millimeters. This length of the frame 2 and the length of the paddle 3 are both measured along the same line 6. Accordingly, the size of a pressure transducer in the direction of line 6 needs not exceed 23 millimeters.

FIG. 1 also shows two strain gauges 7a, 7b diffused into, implanted into, and/or affixed to the resilient beam portion 4. The strain gauges 7a, 7b may comprise resistors 7a, 7b or capacitors 7a, 7b. In some embodiments, strain gauges 7a, 7b are piezoelectric and/or piezoresistive elements. In some embodiments, strain gauges 7a, 7b comprise fibre optic strain sensors such as Bragg sensors.

The piezoelectric elements 7a, 7b connect to a current supply via suitable bonding wires. No bonding wires are shown on FIG. 1. Bonding wires may also connect the piezoelectric elements 7a, 7b amongst one another. The bonding wires are diffused into, implanted into, and/or affixed to frame 2 and/or to resilient beam portion 4.

Piezoelectric elements 7a, 7b may comprise as surface-mounted devices. In some embodiments, surface-mounted technology provides reduction in size and in weight as well as lower profile. These key advantages are particularly relevant to miniaturized pressure transducers. In addition, the use of surface-mounted components generally lowers manufacturing costs by allowing the use of highly automated equipment in assembly.

In some embodiments, optical strain gauges 7a, 7b connect via optical fibres. The fibres are diffused into, implanted into, and/or affixed to frame 2 and/or to resilient beam portion 4.

Optical fibres and optical strain gauges offer advantages in hazardous environments.

In some embodiments, recess portions 15a, 15b are arranged at either end of gap 5. In some embodiments, recess portions 15a, 15b comprise bores through frame 2 and/or turned down portions in frame 2 and/or sheet bends. Recess portions 15a, 15b may be disposed symmetrically along either side of resilient beam portion 4. Recess portions 15a, 15b allow control of the distribution of stress and/or strain within resilient beam portion 4. In some embodiments, recess portions 15a, 15b have a diameter dimension parallel to the inner surface of frame 2 of at least 0.3 mm, at least 0.5 mm, or at least 0.7 mm.

Figure 2:
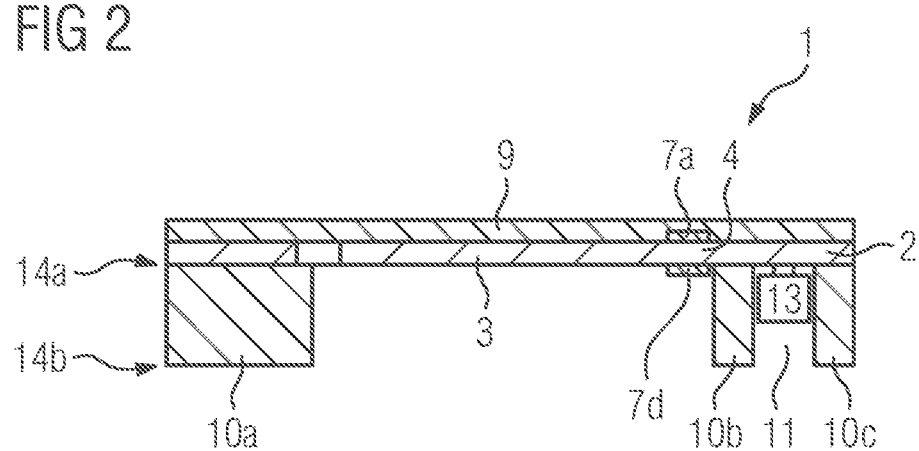
FIG. 2 is a cross-section view of an example pressure transducer according to the instant disclosure.

FIG. 2 depicts a cross-section view taken along line 8 of FIG. 1. In some embodiments, frame 2, paddle 3, and resilient beam portion 4 all have the same thickness or substantially the same thickness. In some embodiments, frame 2 has sufficient thickness to reliably anchor the cantilevered beam. In some embodiments, frame 2 is between 0.8 millimeters and 2.0 millimeters thick. In some embodiments, the thickness of frame 2 lies between 1.0 millimeters and 1.4 millimeters. The thickness of frame 2 may be uniform or substantially uniform.

The frame 2, the paddle 3, and the resilient beam portion 4 of the sensor element each include a respective first side. A diaphragm 9 covers, and may be bonded to, one side of paddle 3 and one side of resilient beam portion 4. Diaphragm 9 also covers, and may be bonded to, one side of the (gas-filled) gap 5. The opposite side of the gap 5 is not covered by diaphragm 9.

Diaphragm 9 also covers a portion of or all of the first side of the frame 2. Diaphragm 9 may cover a strip that (largely) encircles the gap 5. Diaphragm 9 may extend from the paddle 3 beyond the gas-filled gap 5 by less than 2 millimeters. In some embodiments, diaphragm 9 may extend beyond the gas-filled gap 5 by less than 1.5 millimeters. In some embodiments, diaphragm 9 extends by 1.0 millimeters or less beyond the (gas-filled) gap 5. Diaphragms 9 with small diameters yield benefits in terms of compact sensor elements.

Diaphragm 9 includes first and second surfaces. In some embodiments, at least one surface of the diaphragm 9 is adhesive. The adhesive surface of diaphragm 9 points toward frame 2, toward paddle 3, toward resilient beam portion 4, and toward arcuate gap 5. An adhesive side of the diaphragm 9 allows for fixation (bonding) of diaphragm 9 to frame 2, to resilient beam portion 4, and to paddle 3. In some embodiments, the diaphragm 9 has no adhesive side.

In pressure transducers, pressures applied to a paddle 3 cause pressure-induced forces. In some embodiments, diaphragm 9 (function membrane 9) is less than 50 micrometers in thickness. Diaphragm 9 may be less than 30 micrometers in thickness. In some embodiments, diaphragm may be less than 15 micrometers thick. Diaphragm 9 can, in particular, be 7 micrometers or 10 micrometers or 12 micrometers thick. Thin diaphragms 9 flex more easily in response to a pressure-induced force. The thickness of diaphragm 9 may be uniform or substantially uniform.

Diaphragm 9 may comprise a polymeric material. Diaphragm 9 may, in particular, comprise polymers selected from the group of polyurethanes. Diaphragm 9 may, by way of example, comprise at least 50% by weight, at least 70% by weight, or at least 90% by weight of polymers selected from the group of polyurethanes.

In some embodiments, diaphragm 9 includes a (circular) portion with a bulge. The bulge or a portion of the bulge is disposed along gap 5 in order that diaphragm 9 does not hinder deflections of paddle 3. The width of gap 5 in comparison to maximum deflections of paddle 3 guides selection of bulges with suitable dimensions. In some embodiments, the bulge may stand less than 600 micrometers from (a plane defined by) the first surface of paddle 3. In some embodiments, the bulge stands less than 500 micrometers from (a plane defined by) the first surface of paddle 3. In some embodiments, the bulge stands approximately 300 micrometers from (a plane defined by) the first surface of paddle 3.

Resilient beam portion 4 as depicted on FIG. 2 has a first side and a second side. The embodiment of FIG. 2 has strain gauges 7a, 7d on either side of resilient beam portion 4. According to an embodiment, two strain gauges are diffused into, implanted into, and/or affixed to the first surface and to the second surface of resilient beam portion 4.

With four strain gauges 7a-7d, strain gauges 7a-7d may comprise a Wheatstone bridge. In some embodiments, strain gauges 7a and 7b are diffused into, implanted into, and/or affixed to a first side of resilient beam portion 4. The strain gauges 7c and 7d are diffused into, implanted into, and/or affixed to a second side of resilient beam portion 4.

As resilient beam member 4 bends, the strain gauges of one surface increase in length while the strain gauges of the opposite surface shorten. With (piezoelectric and/or piezoresistive) resistors as strain gauges, the resistivities of (piezoelectric and/or piezoresistive) resistors arranged on the first surface of resilient beam portion 4 increases. The resistivity of the (piezoelectric) resistors on the second surface of resilient beam portion 4 decreases accordingly. The arrangement of strain gauges 7a-7d in the form of a Wheatstone bridge improves accuracy.

Pressure transducer 1 also includes a support member 10. FIG. 2 shows portions 10a, 10b, 10c of support member 10. In some embodiments, 10a, 10b, and 10c are integral portions of support member 10. Support member 10 may comprise a glass substrate and/or a ceramics substrate. In some embodiments, support member 10 comprises aluminum oxide ceramics ($Al_2O_3$). In some embodiments, support member 10 comprises aluminum oxide ceramics with more than 92% purity. In some embodiments, support member 10 comprises aluminum oxide with 96% purity. In some embodiments, support member 10 comprises aluminum oxide with purity above 99%. Higher levels of purity offer benefits in terms of mechanical tightness, mechanical brittleness, and dielectric strength. In some embodiments, support member 10 comprises a plate.

For compatibility with electronic circuitry, support member 10 may comprise an electrical insulating material. In some embodiments, support member 10 exhibits a volume resistivity at 293K, at 9 Volts and under the application of direct current, of at least $10^{13}$ Ohm·m. In some embodiments, support member 10 exhibits a volume resistivity at 293K, at 9 Volts and under the application of direct current, of at least $10^{14}$ Ohm·m. In some embodiments, support member 10 exhibits a volume resistivity at 293K, at 9 Volts and under the application of direct current, of at least $10^{16}$ Ohm·m.

Support member 10 includes a first surface 14a directed toward the frame 2. First surface 14a of support member 10 abut and/or may be bonded to an adjacent surface of frame 2. First surface 14a is an inner surface, since first surface 14a is interposed between support member 10 and frame 2. Support member 10 includes a cavity between portions 10b and 10c. Cavity 11 houses a signal processing circuit 13. Cavity 11 has a length dimension and a width dimension perpendicular to its length dimension. The length and the width dimensions of cavity 11 are parallel to surface 14a.

For cavity 11 to accommodate signal processing circuit 13, support member 10 may be at least 0.8 mm thick, at least 1.9 mm thick, or at least 2.6 mm thick. These values of thickness are determined between the first (inner) surface 14a and the second (base) surface 14b of support member 10. The thickness of support member 10 may be uniform or substantially uniform.

In some embodiments, cavity 11 may be at least 4 mm long and at least 2 mm wide. In some embodiments, cavity 11 may be at least 6 mm long and at least 2 mm wide. In some embodiments, cavity 11 may be at least 8 mm long and at least 4 mm wide or at least 10 mm long and at least 3 mm wide.

Cavity 11 includes a first aperture in the direction of (inner) surface 14a of support member 10. The first aperture of cavity 11 may be wide enough to enable insertion of signal processing circuit 13. Cavity 11 may include a second aperture in the direction of base surface 14b of support member 10. With two apertures along opposite surfaces 14a, 14b of support member 10, cavity 11 establishes a fluid path between its apertures. The first aperture of cavity 11 is covered by an inner surface of frame 2, in particular by a portion of the inner surface of frame 2.

Pressure transducer 1 also comprises an electric port such as a wiring terminal. The wiring terminal is arranged on an inner surface of frame 2 and is operable to electrically connect to signal processing circuit 13. In some embodiments, the wiring terminal connects to strain gauges 7a-7d via suitable bonding wires.

Signal processing circuit 13 may be mounted, by way of non-limiting example, to frame 2 and/or to an inner sidewall of cavity 11, e.g., bolted connections and/or glue connections to mount signal processing circuit 13 to frame 2 and/or to an inner side-wall of cavity 11. For maximum compactness, signal processing circuit 13 may be entirely installed inside cavity 11. That is, no components (of signal processing circuit 13) other than bonding wires and/or mechanical fixations stand proud of cavity 11. In particular, no components other than bonding wires and/or mechanical fixations stand proud of any apertures of cavity 11.

In some embodiments, signal processing circuit 13 is arranged inside cavity 11 as shown on FIG. 3. As shown in FIG. 2, cavity 11 includes a first aperture in the direction of surface 14a of support member 10. The first aperture of cavity 11 is wide enough to enable insertion of signal processing circuit 13. Cavity 11 may include a second aperture in the direction of base surface 14b of support member 10. With two apertures along opposite surfaces 14a, 14b of support member 10, cavity 11 establishes a fluid path between its apertures.

For maximum compactness, signal processing circuit 13 may be entirely installed inside cavity 11. That is, no components (of signal processing circuit 13) other than bonding wires and/or mechanical fixations stand proud of cavity 11. In particular, no components other than bonding wires and/or mechanical fixations stand proud of any apertures of cavity 11.

Signal processing circuit 13 may include a suitable amplifier to adjust magnitudes of electric output signals obtained from strain gauges 7a-7d. Operational amplifier and/or (field effect) transistors are, by way of non-limiting examples, suitable amplifiers. In some embodiments, signal processing circuit 13 includes a suitable amplifier to adjust magnitudes of electric output signals obtained from strain gauges 7a-7d, wherein strain gauges 7a-7d are arranged into a Wheatstone bridge and/or into a Carey Foster bridge.

In some embodiments, an oversampling technique is employed by signal processing circuit 13. The use of oversampling may, for instance, improve on the signal to noise ratio of any electric output signal obtained from strain gauges 7*a*-7*d*. Strain gauges 7*a*-7*d* may also connect to the sensor input of the signal processing circuit. In some embodiments, signal processing circuit 13 comprises a microcontroller 4 with an integrated analog-to-digital converter 9 employed for analog-to-digital conversion.

In some embodiments, the pressure transducer includes a temperature probe. The temperature probe may be arranged near resistors 7*a*-7*d*. In some embodiments, the temperature probe comprises a PT100 resistor, PT1000 resistor, a NI1000 resistor, or similar. A temperature probe inside pressure transducer 1 may be used to compensate for changes in temperature. In some embodiments, signal processing circuit 13 includes a temperature probe. The temperature probe may be an integral part of a microprocessor of signal processing circuit 13 and thus disposed inside cavity 11.

In some embodiments, signal processing circuit 13 may include a communication interface to a communication bus. The communication bus may comprise a wired or a wireless bus such as a WLAN and/or a Bluetooth bus. An interface communicating over a wireless bus may provide a radio frequency module such as a module capable of quaternary phase-shift keying. In some embodiments, radio frequency module improves on data transmission by limiting sizes of message blocks and/or by extra data redundancy.

In some embodiments, the radio frequency module may be connected to an aerial such as a microwave aerial. The aerial may comprise, by way of non-limiting examples, an aerial installed in the substrate 10, within frame 2, and/or in any enclosure for pressure transducer 1.

In some embodiments, communication interface uses a predetermined communication bus protocol to communicate over communication bus. A predetermined communication bus protocol may, in particular, be a protocol of a physical layer and/or of a link layer and/or of a transport layer.

In some embodiments, the communication interface may, in particular, transmit data such as signals obtained from strain gauges 7*a*-7*d* and/or from any temperature probe. In some embodiments, these signals are processed by a processing unit of signal processing circuit 13 prior to transmission. Processing circuit 13 may provide an analog-to-digital converter to change analog readings obtained from strain gauges 7*a*-7*d* and/or from any temperature probes into digital representations of these readings.

Signal processing circuit 13 may comprise a surface-mounted device and/or an assembly with surface mounted devices. Surface-mounted technology may provide reduction in size and in weight as well as lower profile. These key advantages are particularly relevant to miniaturized pressure transducers. In addition, the use of surface-mounted components generally lowers manufacturing costs by allowing the use of highly automated equipment in assembly.

Signal processing circuit 13 may comprise an integrated circuit and/or as an assembly with integrated circuits. Key advantages of integrated circuits are reduced complexity as well as lower profile. These key advantages are particularly relevant to miniaturized pressure transducers. In addition, the use of integrated circuits generally cuts manufacturing costs by saving parts.

A pressure transducer with the aforementioned communication functionality can be employed in a system of networked devices. The system of networked devices may comprise several pressure transducers as described herein. Typically, a system of networked device also comprises a controller such as a controller for a heating, air-conditioning and/or ventilation system. Pressure transducer 1 may then transmit data to controller. Also, controller may probe the pressure transducer for measurement data.

Signal processing circuit 13 may include an energy harvesting circuit such as a circuit for harvesting energy from radio frequency signals. In some embodiments, an energy harvesting circuit connects to the aforementioned aerial. In some embodiments, an energy harvesting circuit connects to an energy storage medium such as a (rechargeable) battery. An energy harvesting circuit offers particular benefits for transducers that come as constrained sensors.

In other words, the instant disclosure teaches a pressure transducer 1 for measuring pressure, the pressure transducer 1 comprising:

a frame 2, at least a cantilevered beam 3, at least a resilient beam portion 4, a signal processing circuit 13, at least a wiring terminal and a support member 10;

wherein a gap 5 is interposed between the at least a cantilevered beam 3 and the frame 2 and wherein the at least a resilient beam portion 4 anchors the at least a cantilevered beam 3 to the frame 2;

wherein the frame 2, the at least a cantilevered beam 3, and the at least a resilient beam portion 4 each provide a first surface and wherein the frame 2 provides an inner surface opposite to its first surface;

wherein the at least a cantilevered beam 3 is configured to move from a first position relative to the frame 2 to a second position relative to the frame 2 in response to a pressure-induced force applied to the at least a cantilevered beam 3;

wherein the at least a resilient beam portion 4 is configured to bend due to said movement of the at least a cantilevered beam 3 thereby producing a strain within the at least a resilient beam portion 4, wherein the support member 10 provides an inner surface 14*a* abutting the inner surface of the frame 2 such that the inner surface 14*a* of the support member 10 is interposed between the support member 10 and the frame 2;

wherein the support member 10 comprises at least a cavity 11;

wherein the signal processing circuit 13 is entirely installed inside the at least a cavity 11 of the support member 10;

wherein the at least a wiring terminal is mounted (affixed) to the frame 2 and wherein the signal processing circuit 13 electrically connects to the at least a wiring terminal.

In some embodiments, a sensor comprises at least a strain sensor 7*a*-7*d*, in particular at least a strain sensor 7*a*-7*d*) mounted on or affixed to the at least a resilient beam portion 4. In an embodiment, the pressure transducer comprises the at least a strain sensor 7*a*-7*d*, in particular the at least a strain sensor 7*a*-7*d* mounted on or affixed to the at least a resilient beam portion 4. The at least a strain sensor 7*a*-7*d* is thus configured to produce a signal indicative of (a) strain within the at least a resilient beam portion 4. The at least a strain sensor 7*a*-7*d* can be at least a strain gauge 7*a*-7*d*. A strain within the resilient beam portion 4 may be generated and/or produced as a consequence of bending the at least a cantilevered beam 3.

In some embodiments, the at least a wiring terminal is configured to connect to at least a strain gauge 7*a*-7*d*. In some embodiments, the frame 2, the at least a cantilevered beam 3, and the at least a resilient beam portion 4 each provide a first surface for mounting a diaphragm 9.

In some embodiments, the pressure transducer 1 comprises at least a strain gauge 7*a*-7*d* and wherein the at least a strain gauge 7*a*-7*d* is diffused into and/or implanted into, and/or affixed to the at least a resilient beam portion 4. In some embodiments, the at least a wiring terminal is connected to the at least a strain gauge 7*a*-7*d*.

In some embodiments, the at least a cavity 11 of the support member 10 includes a first aperture disposed along the first surface 14*a* of the support member 10 and the inner surface of the frame 2 covers the first aperture.

In some embodiments, in an aforementioned pressure transducer 1, the at least a cavity 11 of the support member 10 provides a first aperture disposed along the first surface 14*a* of the support member 10 and wherein the inner surface of the frame 2 covers the first aperture.

In some embodiments, in an aforementioned pressure transducer 1, the at least a cavity 11 provides at least an inner side-wall arranged adjacent the first aperture.

In some embodiments, the support member 10 provides a base surface 14*b* opposite to its inner surface 14*a* and wherein the at least a cavity 11 of the support member 10 provides a second aperture disposed along the base surface 14*b* of the support member 10.

In some embodiments, the thickness of the support member 10 between its inner surface 14*a* and its base surface 14*b* is at least 800 micrometers.

In some embodiments, the first surface 14*a* of the support member 10 is bonded to the second surface of the frame 2.

In some embodiments, the frame 2 is made of an electrically insulating material.

In some embodiments, the support member 10 is made of an electrically insulating material.

In some embodiments, the thickness of the frame 2 between its first surface and its inner surface is less than 250 micrometers.

In some embodiments, the pressure transducer 1 further comprises at least a strain gauge 7*a*-7*d* and wherein the at least a strain gauge 7*a*-7*d* is diffused into and/or implanted into, and/or affixed to the at least a resilient beam portion 4 such that the at least a strain gauge 7*a*-7*d* is configured to produce an output signal as a function of the strain within the at least a resilient beam portion 4.

In some embodiments, the pressure transducer 1 further comprises at least two bonding wires and wherein each of the at least two bonding wires electrically connects to the at least a strain gauge 7*a*-7*d*.

In some embodiments, at least one of the bonding wires electrically connects to the at least a wiring terminal mounted (affixed) to the frame 2.

In some embodiments, the signal processing circuit 13 is mechanically mounted (affixed) to the at least an inner side-wall of the at least a cavity 11.

In some embodiments, the signal processing circuit 13 is mechanically mounted (affixed) to the frame 2.

In some embodiments, the gap 5 provides a first end of the gap 5 and a second end of the gap 5, and
  wherein the gap 5 provides a first recess portion 15*a* arranged at its first end and a second recess portion 15*b* arranged at its second end, and
  wherein the first recess portion 15*a* and the second recess portion 15*b* are symmetrically arranged around the at least a resilient beam portion 4.

In some embodiments, the diaphragm 9 is flush-mounted and/or is bonded to the first surface of the resilient beam portion 4.

In some embodiments, the thickness of the diaphragm 9 between its first surface and its second surface is less than 30 micrometers.

In some embodiments, the thickness of the diaphragm 9 between its first surface and its second surface is less than 15 micrometers.

In some embodiments, the second surface of the diaphragm 9 is adhesive.

In some embodiments, a portion of the second surface of the diaphragm 9 is adhesive.

In some embodiments, the gap 5 is an arcuate gap.

In some embodiments, the diaphragm 9 is made of a polymeric material.

In some embodiments, the diaphragm 9 contains polymers selected from the group of polyurethanes.

In some embodiments, the at least a cantilevered beam 3 is configured to move from a first position relative to the frame 2 to a second position relative to the frame 2 and vice versa.

In some embodiments, the at least a cantilevered beam 3 is configured to move from a first position relative to the frame 2 to a second position relative to the frame and to any position between the first position of the at least a cantilevered beam 3 and the second position of the at least a cantilevered beam 3.

In some embodiments, the thickness of the at least a cantilevered beam 3 between its first surface and its second surface is less than 250 micrometers.

In some embodiments, the thickness of the at least a cantilevered beam 3 between its first surface and its second surface is less than 150 micrometers.

In some embodiments, the thickness of the at least a cantilevered beam 3 between its first surface and its second surface is 120 micrometers.

In some embodiments, the thickness of the at least a cantilevered beam 3 between its first surface and its second surface is 100 micrometers.

In some embodiments, the frame 2 comprises a second surface opposite its first surface and wherein the thickness between the first surface of the frame 2 and the second surface of the frame 2 is the same as the thickness between the first surface of the at least a cantilevered beam 3 and the second surface of the at least a cantilevered beam 3.

In some embodiments, the at least a resilient beam portion 4 comprises a second surface opposite its first surface and wherein the thickness between the first surface of the at least a beam portion 4 and the second surface of the at least a resilient beam portion 4 is the same as the thickness between the first surface of the at least a cantilevered beam 3 and the second surface of the at least a cantilevered beam 3.

In some embodiments, the pressure transducer 1 further comprises at least a strain gauge 7*a*-7*d* and wherein the at least a strain gauge 7*a*-7*d* is diffused into and/or implanted into, and/or affixed to the at least a resilient beam portion 4 such that the at least a strain gauge 7*a*-7*d* is configured to convert strain within the at least a resilient beam portion 4 into an output signal of the strain gauge 7*a*-7*d*.

In some embodiments, the pressure transducer 1 further comprises at least two bonding wires and wherein each of the at least two bonding wires connects to the at least a strain gauge 7*a*-7*d*.

In some embodiments, the pressure transducer 1 further comprises at least a temperature sensor and wherein the at least a temperature sensor is diffused into and/or implanted into, and/or affixed to the at least a resilient beam portion 4 such that the at least a temperature sensor is configured to convert the temperature of or near the at least a resilient beam portion 4 into an output signal of the temperature sensor.

In some embodiments, the pressure transducer 1 further comprises at least a temperature sensor and wherein the at least a temperature sensor is diffused into and/or implanted into, and/or affixed to the frame 2 such that the at least a temperature sensor is configured to convert the temperature of or near the frame 2 into an output signal of the temperature sensor.

In some embodiments, the signal processing circuit 13 further comprises at least a temperature sensor such that the at least a temperature sensor is disposed inside the at least a cavity 11.

In some embodiments, diaphragm 9 comprises a portion with a bulge and wherein said portion with the bulge is disposed along gap 5.

In some embodiments, the first surface of the at least a cantilevered beam 3 is circular.

In some embodiments, the first surface of the at least a cantilevered beam 3 is rectangular.

In some embodiments, the first surface of the at least a cantilevered beam 3 is quadratic.

In some embodiments, the first surface of the at least a cantilevered beam 3 is triangular.

In some embodiments, the at least a cantilevered beam 3 has a diameter along (parallel to) its first surface and wherein said diameter is less than 25 millimeters.

In some embodiments, the at least a cantilevered beam 3 has a diameter along its first surface and wherein said diameter is less than 20 millimeters.

In some embodiments, the at least a cantilevered beam 3 has a diameter along its first surface and wherein said diameter is less than 15 millimeters.

In some embodiments, the at least a cantilevered beam 3 has a diameter along its first surface and wherein said diameter is less than 10 millimeters.

In some embodiments, a circuit for heating, cooling, air-conditioning and/or ventilation comprises a pressure transducer 1 according to the instant disclosure.

In some embodiments, the circuit is a variable air volume system.

In some embodiments, the pressure transducer of the instant disclosure is used in a fuel cell. In some embodiments, the fluid is gaseous fuel. The pressure transducer 1 in a fuel cell advantageously generates a signal indicative of differential pressure of a gaseous fluid such as differential pressure of gaseous fuel. In some embodiments, the fuel cell is a solid oxide fuel cell. In some embodiments, the fuel cell is a polymer electrolyte fuel cell. In other words, the instant disclosure teaches an apparatus with at least a fuel cell and with at least a pressure transducer 1 according to the instant disclosure.

In some embodiments, an apparatus comprises at least a fuel cell and at least a pressure transducer 1 according to the instant disclosure, wherein the at least a pressure transducer 1 is configured to generate a signal indicative of differential pressure of a fluid such as gaseous fuel.

In some embodiments, an apparatus comprises at least a cogeneration plant and with at least a pressure transducer 1 according to the instant disclosure. In some embodiments, an apparatus comprises at least a cogeneration plant and at least a pressure transducer 1 according to the instant disclosure, wherein the at least a pressure transducer is configured to generate a signal indicative of differential pressure of a fluid such as gaseous fuel.

In some embodiments, pressure transducer 1 is employed to measure differential pressure of a fluid, in particular of a (combustible) gas and/or of air. This particular type of pressure transducer may, by way of non-limiting example, be arranged in a (side channel of) a Venturi tube and/or in a Venturi burner. The pressure transducer may be employed to regulate and/or (PID) control parameters of the burner such as the speed of a blower and/or gas/air ratios and/or valve positions.

In some embodiments, at least one component such as the cantilevered beam 3 and/or the frame 2 and/or the resilient beam portion 4 and/or the support member 10 is manufactured via an additive manufacturing technique such as three-dimensional printing.

Parts of the pressure transducer 1 or parts of a method according to the present disclosure may be embodied in hardware, in a software module executed by a processor, or by a cloud computer, or by a combination thereof. The software may include a firmware, a hardware driver run in the operating system, or an application program. Thus, the disclosure also relates to a computer program product for performing the operations presented herein. If implemented in software, the functions described may be stored as one or more instructions on a computer-readable medium. Some examples of storage media that may be used include random access memory (RAM), magnetic RAM, read only memory (ROM), flash memory, EPROM memory, EEPROM memory, registers, a hard disk, a removable disk, other optical disks, a Millipede® device, or any available media that can be accessed by a computer or any other IT equipment or appliance.

It should be understood that the foregoing relates only to certain embodiments and that numerous changes may be made therein without departing the scope of the invention as defined by the following claims. It should also be understood that the teachings herein are not restricted to the illustrated embodiments and that various modifications can be made within the scope of the following claims.

REFERENCE NUMERALS

1 pressure transducer
2 frame
3 cantilevered beam
4 beam portion
5 gap
6 line
7, 7a-7d strain gauges
8 line
9 diaphragm
10, 10a, 10b, 10c support member (plate)
11 (hollow) cavity
12 (hollow) cavity
13 signal processing circuit
14a, 14b surfaces of support member 10
15a, 15b recess portions

The invention claimed is:

1. A pressure transducer comprising:
a frame;
a cantilevered beam;
a resilient beam portion;
a signal processing circuit;
a wiring terminal; and
a support member;
a gap defined between the cantilevered beam and the frame;
wherein the resilient beam portion anchors the cantilevered beam to the frame;
wherein the frame, the cantilevered beam, and the resilient beam portion each include a first surface;

wherein the frame includes an inner surface opposite to its first surface;

wherein the cantilevered beam moves from a first position to a second position relative to the frame in response to a pressure-induced force applied to the cantilevered beam;

wherein the resilient beam portion bends due to said movement of the cantilevered beam producing a strain within the resilient beam portion;

wherein the support member includes an inner surface abutting the inner surface of the frame such that the inner surface of the support member is interposed between the support member and the frame;

wherein the support member comprises a cavity and the signal processing circuit is entirely installed inside the cavity;

wherein the wiring terminal is mounted to the frame and the signal processing circuit electrically connects to the wiring terminal;

wherein the pressure transducer comprises a strain gauge diffused into, implanted into, and/or affixed to the resilient beam portion;

wherein the cavity of the support member includes a first aperture disposed along the first surface of the support member and the inner surface of the frame covers the first aperture.

2. The pressure transducer according to claim 1, wherein the cavity includes an inner side-wall arranged adjacent the first aperture.

3. The pressure transducer according to claim 1, wherein:
the support member includes a base surface opposite to the inner surface; and
the cavity of the support member includes a second aperture disposed along the base surface of the support member.

4. The pressure transducer according to claim 3, wherein a thickness of the support member between its inner surface and its base surface is at least 800 micrometers.

5. The pressure transducer according to claim 1, wherein the first surface of the support member is bonded to the second surface of the frame.

6. The pressure transducer according to claim 1, wherein the frame comprises an electrically insulating material.

7. The pressure transducer according to claim 1, wherein the support member comprises an electrically insulating material.

8. The pressure transducer according to claim 1, wherein a thickness of the frame between its first surface and its inner surface is less than 250 micrometers.

9. The pressure transducer according to claim 1, wherein the strain gauge is diffused into, implanted into, and/or affixed to the resilient beam portion such that the strain gauge produces an output signal as a function of the strain within the resilient beam portion.

10. The pressure transducer according to claim 9, further comprising two bonding wires electrically connected to the strain gauge.

11. The pressure transducer according to claim 10, wherein at least one of the bonding wires electrically connects to the wiring terminal mounted to the frame.

* * * * *